April 14, 1931.  R. F. KOHR  1,800,391

BRAKE

Filed April 23, 1928

INVENTOR.
Robert F Kohr
BY P. W. Pomeroy
ATTORNEY

Patented Apr. 14, 1931

1,800,391

UNITED STATES PATENT OFFICE

ROBERT F. KOHR, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed April 23, 1928. Serial No. 272,149.

This invention relates to brakes for motor vehicles and particularly to means for distributing the braking pressure to the front and rear brakes whereby an equal braking pressure will be applied to each of the brakes.

The principal object of this invention is to provide a motor vehicle with a four wheel brake equalizer which is simple in construction, efficient in operation, and very economical to manufacture.

Another object is to provide a motor vehicle with a four wheel brake equalizer comprising a rotatable cross shaft bodily movable longitudinally of the vehicle to equally distribute braking pressure between the front and rear brakes.

A further object is to provide a motor vehicle with a four wheel brake equalizer comprising a transverse shaft having connections at its ends with front and rear brakes, spaced double-armed levers secured thereto, double armed levers pivotally mounted to the vehicle clutch housing, one of which is provided with a foot pedal, and a plurality of links connecting the ends of the double ended levers on the shaft with the ends of the pivotally mounted double ended levers mounted on the clutch housing whereby movement of the foot pedal causes rotation of the shaft to apply the brakes, the links allowing the shaft to swing forwardly or rearwardly to equally distribute the braking pressure between the front and rear brakes.

These being among the objects of the present invention the same consists of certain features of construction and combinations of parts to be hereinafter described with reference to the accompanying drawing and then claimed, having the above and other objects in view.

In the accompanying drawing which illustrates a suitable embodiment of the present invention, Figure 1 is a side elevation of a motor vehicle chassis showing the brake hookup therefor.

Figure 1:
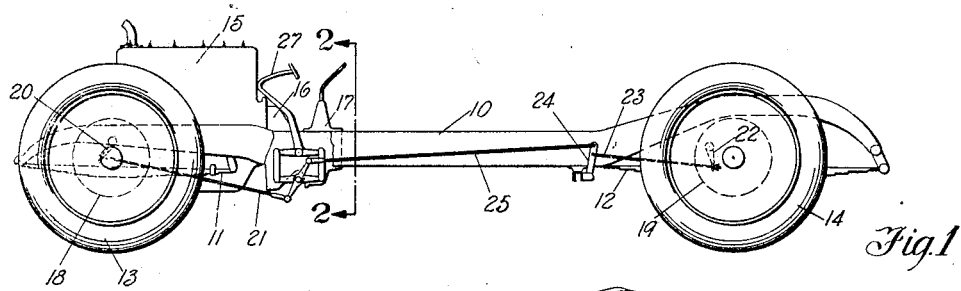

Referring to the accompanying drawing in which like numerals refer to like parts throughout the several views, the automobile chassis shown is of conventional construction having frame side rails 10, front and rear springs 11 and 12 respectively supporting the side rails 10 on the front and rear axles (not shown), and front and rear road wheels 13 and 14 respectively. An engine 15 is supported by the forward ends of the frame side rails 10 and is connected by a suitable clutch (not shown) contained with a clutch housing 16 to the transmission unit 17. The front and rear wheels 13 and 14 are provided with brakes 18 and 19 respectively shown in broken outline in Figure 1.

The front wheel brake mechanisms 18 are actuated by levers 20 which are connected to rearwardly extending brake rods 21, and the rear brake mechanisms 19 are likewise actuated by levers 22 connected to brake rods 23. The forward ends of these brake rods 23 are pivoted to arms 24 swingably supported by the frame side rails 10. Forwardly extending rods 25 are also pivotally connected at their rear ends to the swingable arms 24.

A rotatable rock shaft 26 extending transversely of the vehicle frame is provided with double-ended levers 29 at its extremities which are pivotally pinned to the clevis ends of the front brake rods 21 and rear brake rods 25. When the rock shaft 26 is rotated the levers 29 pull the brake rods 21 and 25 toward each other and actuate the brakes 18 and 19.

Figure 2:
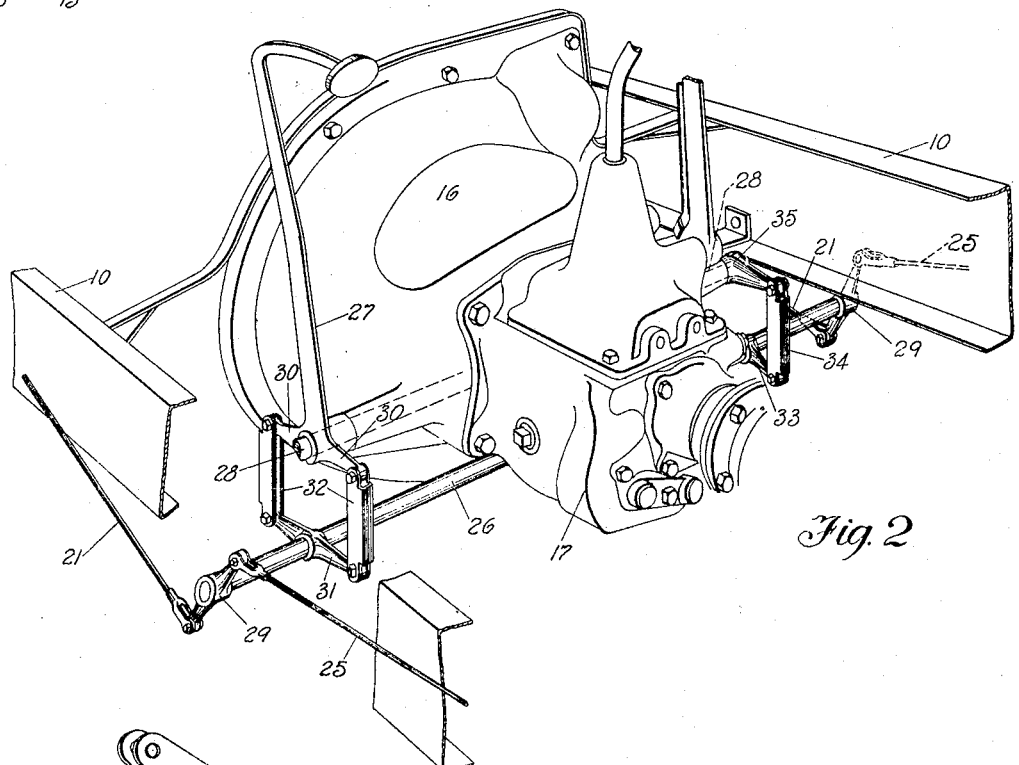
Figure 2 is an enlarged fragmentary perspective view of the chassis taken approximately on the line 2—2 of Figure 1 showing the brake rock shaft and means for operating the same.
Figure 3:
Figure 3 is an enlarged perspective view of one of the links for connecting the shaft with the brake foot pedal.

The shaft 26 is rotated by means of the conventional brake pedal 27 which is pivotally supported on the clutch operating shaft 28 that is carried by the clutch housing 16 as shown in Figure 2. The brake pedal 27 is formed with diametrically opposite arms 30 which are connected to the ends of a double ended member 31 secured to the shaft 26 by suitable links 32, one of which is shown in enlarged perspective in Figure 3. Spaced from the lever 31 and on the opposite side of the transmission 17 is another double ended member 33 which is connected at its ends by similar links 34 to a member 35 having diametrically opposed arms. This member 35 is pivotally supported between its ends preferably upon its clutch shaft 28 so that it is free to rotate. The links 32 and 34 are preferably made from sheet metal stampings to present a U-shaped appearance as shown in Figure 3.

Figure 4:
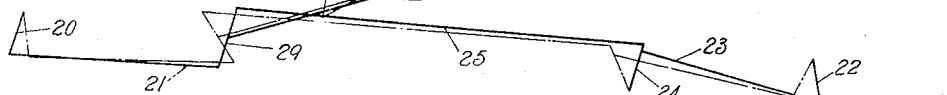
Figure 4 is a diagrammatic perspective view of the brake operating and equalizing mechanism, the solid lines thereof showing the same in normal inoperative position, and the broken lines showing the same moved to one of its operative positions.

In order to clearly show the operation of the brake equalizing mechanism of the present invention, the same is shown diagrammatically in Figure 4, the solid lines showing the same in normal inoperative position and the broken lines showing the same in one of its operating positions. First when it is desired to apply the brakes 18 and 19, the foot pedal 27 is depressed which by means of the levers 30 and 31 and links 32 rotates the shaft 26 causing the rods 21 and 25 to be drawn toward each other. This movement of the rods 21 and 25 pivots the brake levers 20 and 22 to actuate the brakes 18 and 19 respectively. This is substantially the action which occurs when the four brakes are adjusted so as to be applied with equal movement and all the rods are of the proper length to allow this movement. Consequently the rock shaft 26 then only rotates.

When, however, the rear brakes 19 require more movement to apply the same than the front brakes 18 or vice versa, the movement imparted to one brake must be different than that imparted to the other, hence the equalizing rock shaft 26 comes into operation to effect the desired result.

In Figure 4, the broken outline of the equalizing mechanism represents the position of the same when the brakes are applied in the case where the rear brakes 19 require more movement to be applied than the front brakes 18. The shaft 26 is rotated by depressing the foot pedal 27 and the brake rods 21 and 25 are moved toward each other to actuate the levers 20 and 22. The front brakes 18 engage more quickly than the rear brakes 19 due to the smaller movement required and then further rotation of the shaft 26 causes the same to swing forwardly as shown to completely engage the rear brakes 19 and therefore equally distribute the braking pressure between the front and rear brakes. In other words, the shaft 26, because it is entirely suspended by the links 32 and 34, is free to swing longitudinally of the vehicle and therefore moves in the necessary forward or rearward direction to equally distribute the braking pressure produced by the rotation of the same. Although only one condition of equalization is shown, it is believed that the resulting movement of the mechanism under other conditions of unequal movements of the brake levers 20 and 22 will be apparent from a study of the description and drawings.

While but one embodiment of the present invention is described and illustrated, it is to be understood that formal changes may be made in the specific embodiment of the invention described without departing from the spirit and substance of the broad invention the scope of which is commensurate with the appended claims.

What I claim is:

1. In a motor vehicle having a clutch unit provided with a transversely extending clutch operating shaft, a brake rock shaft parallel to said clutch shaft, and means on said clutch shaft for hingedly supporting said brake rock shaft.

2. In a motor vehicle having a clutch unit provided with a transversely extending clutch operating shaft, a brake operating member pivotally mounted on said shaft, a brake rock shaft parallel to said clutch shaft, and pivoted means on said brake operating member for hingedly supporting said brake rock shaft to allow movement of the same longitudinally of said vehicle.

3. In a motor vehicle having a clutch unit provided with a transversely extending clutch operating shaft, spaced double levers pivotally mounted on said shaft, a brake rock shaft parallel to said clutch shaft having spaced double levers thereon, and links pivoted to the ends of said levers on said clutch shaft and to the ends of said levers on said brake shaft to allow bodily shiftable movement of said brake shaft longitudinally of said vehicle.

4. In a vehicle having front and rear wheel brakes, levers operatively connecting each front wheel brake with its respective rear wheel brake, a rock shaft interconnecting said levers, means for hingedly supporting said rock shaft to permit movement thereof longitudinally of said vehicle, and means for moving said supporting means to rotate said rock shaft for operating said brakes.

5. In a vehicle having front and rear wheel brakes, levers operatively connecting each front wheel brake with its respective rear wheel brake, a rock shaft interconnecting said levers, a brake operating member, means hingedly connecting said rock shaft and brake operating member for supporting said shaft and permitting rotation thereof upon movement of said member and for allowing said rock shaft to move longitudinally of said vehicle upon rotation of the same to equally distribute braking pressure between each of said front wheel brakes and its respective rear wheel brake.

6. In a vehicle having front and rear wheel brakes, levers operatively connecting each front wheel brake with its respective rear wheel brake, a rock shaft interconnecting said levers, oppositely disposed arms on said rock shaft, brake operating member having diametrically opposed arms, and a plurality of links pivotally connecting the ends of said arms of said brake operating member to permit swinging movement of said shaft longitudinally of said vehicle and to rotate said shaft upon movement of said brake operating member thereby to equally distribute the braking pressure between each of said front wheel brakes and its respective rear wheel brakes.

7. In a motor vehicle having front and rear wheel brakes, and a clutch unit provided with a clutch operating shaft, levers connecting each front wheel brake with its respective rear wheel brake, a rock shaft securely interconnecting said levers, spaced double levers secured to said shaft, double levers pivotally mounted on said clutch shaft at each side of said clutch unit, a plurality of links pivotally connecting the ends of the double levers on said shaft with the ends of the said pivoted double levers, and a brake foot pedal secured to one of said pivotally mounted levers whereby movement of said pedal rotates said shaft to apply said brakes, said links permitting movement of said shaft longitudinally of said vehicle to equalize the braking pressure between each front wheel brake and its respective rear wheel brake.

8. In a braking mechanism for a motor vehicle, a rotatable brake cross shaft, spaced members intermediate the ends of said shaft each having oppositely disposed arms, and pivoted links having their lower ends pivoted to said arms whereby said cross shaft may swing longitudinally of said vehicle.

9. In a brake mechanism for a motor vehicle, a brake rock shaft bodily movable longitudinally of said vehicle, and a support therefor comprising a plurality of members pivoted at adjacent ends to each other to form a closed figure, one of said members being secured to said cross shaft.

10. In a brake mechanism for a motor vehicle, a brake rock shaft extending transversely of said vehicle, the sole support therefor comprising a plurality of members pivoted to each other at adjacent ends to form a closed figure, one of which is secured intermediate its ends to said cross shaft and the member opposite thereto being constrained to pivotal movement about an axis intermediate its ends, thereby to permit rotation of said shaft and to permit movement of said shaft longitudinally of said vehicle.

Signed by me at South Bend, this 20th day of April, 1928.

ROBERT F. KOHR.